United States Patent
Kaplan (10) Patent No.: US 7,913,165 B2
(45) Date of Patent: Mar. 22, 2011

(54) INSERTING OBJECTS USING A TEXT EDITOR THAT SUPPORTS SCALABLE FONTS

(75) Inventor: Diego Kaplan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 1493 days.

(21) Appl. No.: 11/304,122

(22) Filed: Dec. 15, 2005

(65) Prior Publication Data

US 2007/0168945 A1 Jul. 19, 2007

(51) Int. Cl.
*G06F 9/44* (2006.01)
*G06F 17/27* (2006.01)

(52) U.S. Cl. .................. 715/255; 717/110; 717/113

(58) Field of Classification Search .......... 717/110–113, 717/120, 136; 715/201–204, 211, 230–242, 715/255–277
See application file for complete search history.

(56) References Cited

U.S. PATENT DOCUMENTS

| | | | | |
|---|---|---|---|---|
| 5,495,565 A * | 2/1996 | Millard et al. | ................. | 715/209 |
| 5,669,005 A | 9/1997 | Curbow et al. | | |
| 5,995,920 A * | 11/1999 | Carbonell et al. | ................. | 704/9 |
| 6,141,002 A * | 10/2000 | Kanungo et al. | ............. | 715/716 |
| 6,490,051 B1 | 12/2002 | Nguyen et al. | | |
| 6,845,488 B1 * | 1/2005 | Shim et al. | ..................... | 715/815 |
| 7,194,680 B1 * | 3/2007 | Roy et al. | ....................... | 715/205 |
| 7,231,610 B2 * | 6/2007 | Kawashima et al. | ......... | 715/780 |
| 7,472,065 B2 * | 12/2008 | Aaron et al. | .................. | 704/258 |
| 7,568,156 B1 * | 7/2009 | Fischer et al. | ................ | 715/256 |
| 2001/0029542 A1 * | 10/2001 | Nishimura | .................... | 709/231 |
| 2002/0093683 A1 | 7/2002 | Focazio et al. | | |
| 2002/0146181 A1 | 10/2002 | Azam et al. | | |
| 2003/0060240 A1 * | 3/2003 | Graham et al. | ............... | 455/566 |
| 2004/0139232 A1 * | 7/2004 | Giannetti et al. | ............. | 709/246 |
| 2004/0183817 A1 * | 9/2004 | Kaasila | .......................... | 345/660 |
| 2004/0252122 A1 * | 12/2004 | Rothman et al. | .............. | 345/467 |
| 2005/0146528 A1 * | 7/2005 | Kotiranta | ...................... | 345/467 |
| 2005/0165721 A1 * | 7/2005 | Inkinen | ............................ | 707/1 |

(Continued)

FOREIGN PATENT DOCUMENTS

WO   WO 0250650 A2 *   6/2002

OTHER PUBLICATIONS

Thin Client Computing for Rich Text Presentation, Jun. 2001, Koichi Mori, Nokia Research Center, www.mkg.sfc.keio.ac.jp/IAC/Paper-IPSJ-IAC.doc.*

(Continued)

*Primary Examiner* — Doug Hutton
*Assistant Examiner* — Zaida I Marrero (57) ABSTRACT

A system and method configured to support inserting at least one object in a text editor comprises a text editor module, a text rasterizer module, at least one object to be inserted, and a separate object interpreter module. The text editor module is unable to insert an object directly and is configured to support UNICODE and scalable fonts. The text editor module comprises a first set of UNICODE numerical values and a second set of UNICODE numerical values. The text rasterizer module is associated with the text editor module and is configured to use at least one of the first set of numerical values to generate text to display in a display area. The user selected object to be inserted is associated with the second set of numerical values usable by the text editor. The separate object interpreter module is configured to receive the second set of numerical values and insert the object into the display area.

11 Claims, 5 Drawing Sheets

U.S. PATENT DOCUMENTS

2005/0229117 A1* 10/2005 Hullender et al. ............ 715/863
2005/0240393 A1* 10/2005 Glosson ........................... 704/8
2005/0289479 A1* 12/2005 Yoshida et al. ............... 715/816
2006/0035587 A1* 2/2006 Shimizu ....................... 455/3.06
2006/0053386 A1* 3/2006 Kuhl et al. .................... 715/773
2006/0085529 A1* 4/2006 Ziegler et al. ................. 709/223
2006/0265649 A1* 11/2006 Danilo .......................... 715/542

OTHER PUBLICATIONS

Biblioscape, "Rich Text Format (RTF) Version 1.5 Specification" www.biblioscape.com/rtf15, pp. 1-90.

* cited by examiner

INSERTING OBJECTS USING A TEXT EDITOR THAT SUPPORTS SCALABLE FONTS

FIELD OF THE INVENTION

The claimed subject matter pertains generally to mobile phones, PDAs, notepads, and other portable or embedded devices having limited CPU and/or memory resources. More particularly, the claimed subject matter provides for the efficient addition of picture handling capabilities to text editors that support scalable fonts.

BACKGROUND OF THE INVENTION

Editing or document creation capabilities in high tech devices, from large computers to small hand-held devices, fall into two general categories. First is the type of editor most users have come to expect in desk-top systems from the major vendors, including Microsoft®, Apple®, Sun Microsystems®, etc. These full-functional editors provide a rich environment for a user, including the ability to insert or embed a wide variety of objects in a file. The embeddable objects include the ability to embed pictures or symbols.

The second type of editor is the basic text editor that is used with mobile phones, PDAs, embedded systems, and the like. These devices are resource constrained, having both memory and CPU limitations not present in general purpose desk top computers and larger systems. Because of these resource limitations, text editors currently found in these environments do not have the ability to embed arbitrary objects in documents. Their functionality is limited to character-based text editing, often without formatting support and certainly without the ability to embed non-text objects in a text string.

Thus, there is a need for an efficient way of placing pictorial objects and/or symbols in text strings, or simple documents, using resource-constrained text editors.

SUMMARY OF THE INVENTION

A system configured to support inserting at least one object in a text editor. The text editor system comprises a text editor module, a text rasterizer module, at least one object to be inserted, and a separate object interpreter module. The text editor module is unable to insert an object directly. The text editor module is configured to support UNICODE and scalable fonts and comprises a first set of UNICODE numerical values and a second set of UNIQUE numerical values. The text rasterizer module is configured to use at least one of the first set of numerical values to generate text to display in a display area. The text rasterizer module is associated with the text editor module. The user selected object to be inserted is associated with the second set of numerical values usable by the text editor. The separate object interpreter module is configured to receive the second set of numerical values and insert the object into the display area.

A method for inserting at least one object in a device having a text editor is described. The method comprises providing a text editor module that is configured to support UNICODE and scalable fonts. The text editor comprises a first set of UNICODE numerical values and a second set of UNICODE numerical values. The text editor module is associated with the text rasterizer module, and the method associates the first set of UNICODE numerical values with the text rasterizer module, which is configured to generate text to display on a display area. The method detects a user request to insert an object associated with the second set of numerical values usable by the text editor. The method then associates the second set of numerical values with a separate object rasterizer module that is configured to insert the object into the display area.

BRIEF DESCRIPTION OF THE DRAWINGS

References to the following drawings which are for illustrative purposes, and not for limiting purposes describe one or more illustrative embodiments.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems described hereinafter may vary as to configuration, as to details, and as to the functionality of system elements. Additionally, the method may vary as to details, partitioning, repetition, act inclusion, order of the actions, or other variations without departing from the illustrative method disclosed herein.

The system and method described herein enables the insertion of objects, e.g. pictures and sounds, in devices that currently use functionally limited text editors. By way of example and not of limitation, a device having a functionally limited text editor is a mobile phone. Although the descriptions herein are given in the mobile phone context, the systems and methods are applicable with any device that use a text editor with scalable fonts. Such devices include, but are not limited to, personal digital assistants, tablets, notepads, mobile inventory devices, pagers, embedded systems, and other such electronic devices.

Text editors manage the display of characters on a screen. Text editors for resource constrained devices are simple, and do not support inserting objects into the text. In particular, they do not support the insertion of objects, e.g. pictures and sound, into a text string or text stream. Generally, text is managed using an internal (to the text editor) numerical value associable with a text character, coupled with knowledge of the size of the display to be used. An illustrative interpreter module such as a rasterizer is used to generate text. An interpreter module is a software module that interprets and translates information into a form the display can render. In one embodiment, the interpreter module is a software module that comprises a rasterizer that receives an instruction to read a character, performs a scaling function for the character, and adjusts the character for a grid of pixels. Since the interpreter module is a software module, the interpreter module is designed for a particular application.

Figure 1A:
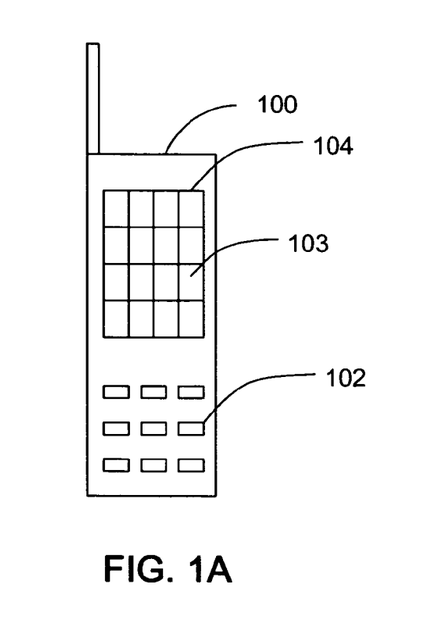
FIG. 1A shows an illustrative mobile phone system according to one embodiment.

Referring to FIG. 1A, there is shown an illustrative mobile phone 100, which is also referred to as a "cell" phone, that has user interfaces 102 and 104. Keyboard 102 is represented as a standard numeric keyboard, but further includes any button layout, as well as other input devices such as voice command and/or voice recognition modules. Display 104 is any type of visual display, including those with touch screen input capabilities. The display comprises a plurality of display area such as display area 103, which has an associated height and width. By way of example, a single text character may be displayed in the display area 103.

Figure 1B:
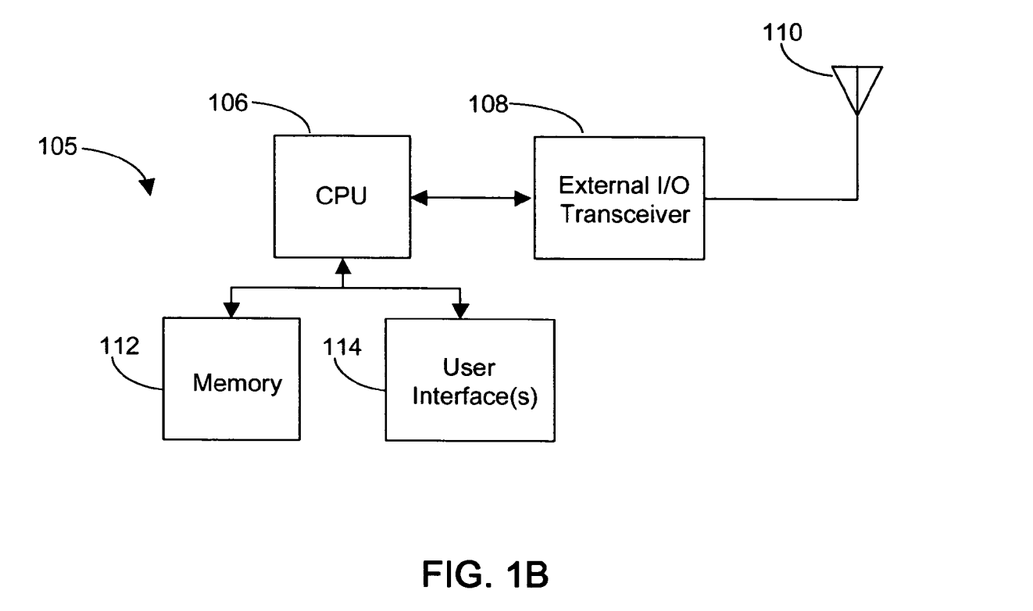
FIG. 1B shows an illustrative mobile phone hardware system according to one embodiment.

Referring to FIG. 1B, there is shown an illustrative mobile phone hardware system 105 that operates within illustrative mobile phone 100. The illustrative hardware system 105 comprises a processor 106 that is supported by memory 112. By way of example and not of limitation, the memory may comprise RAM, ROM, Flash, and any other such memory component. The illustrative memory 112 is communicatively coupled to the illustrative user interface 114. The illustrative memory 112 includes any stored programming and data. The illustrative antenna 110 is communicatively coupled to the transceiver 108. The transceiver 108 may represent a plurality of different external interfaces such as USB interface, RS 485 interface, Ethernet interface, IR interface, and any other such interface which performs in a manner similar to a transceiver 108.

Figure 1C:
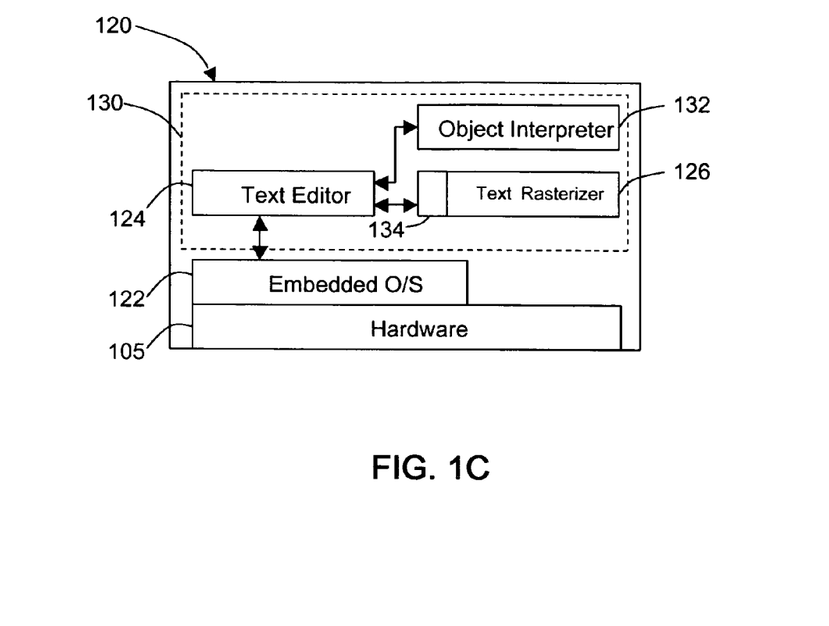
FIG. 1C shows an illustrative mobile phone software system according to one embodiment.

Referring to FIG. 1C, there is shown an illustrative mobile phone software system 120 that operates on the illustrative hardware system 105 described above. The mobile software system 120 includes an operating system (OS) 122. The OS may be of any type, including Microsoft's® CE, Microsoft's embedded Windows XP®, Unix®-based, POSIX-compliant, and/or Linux®-based embedded systems, a proprietary OS, or any other such operating system. The OS is shown as being partially over the mobile phone hardware system 105 because most embedded operating systems allow an application to interface directly with the hardware for certain functions or to control certain devices.

The illustrative text editor module 124 is configured to interface with OS 122. The operating configuration for the text editor module 124 depends on the actual application, but is shown in a common configuration in FIG. 1C. Any and all configurations of text editors may be used in a manner consistent with the description provided herein.

In one embodiment, text editor module 124 makes use of a separate text rasterizer module 126 as shown in FIG. 1C. The text rasterizer module 126 is particularly configured to interpret and translate text information with little or no ability to interpret or translate object information. Text refers to character data that corresponds to a symbol in a written form of a natural language.

An illustrative text rasterizer module provides a means for rasterizing text. The means for rasterizing text may be accomplished with a text rasterizer module that is configured to receive an instruction to read a text character, performs a scaling function for the text character, and adjusts the text character for a grid of pixels. The text rasterizer is typically associated with a text editor system. By way of example and not of limitation, an illustrative text editor system having a text rasterizer module includes Agfa Monotype, iType®, and Adobe® Type Manager®.

In an alternative embodiment, the text editor module 124 and the text rasterizer (not shown) are combined, and are not separate module. Further alternative embodiments may require a slightly different implementation of the text rasterizer. Some text editors may control the display, where the rasterizing software creates a bitmap and provides the bitmap to the text editor. Other text editors may be configured to allow the rasterizing software to generate images displayable directly on screen, as directed by the text editor.

Text editors will usually use one of the standard character encoding techniques for their internal representations. Two character encodings are the ASCII numerical encoding for the basic Latin alphabet, and UNICODE which covers most of the major written languages. The numerical values used to represent characters in the text editor are usually the ASCII or UNICODE standards. The UNICODE standards include private areas, where the numbers may be mapped to digital data of the designer's choice.

The illustrative text editor system 130 also comprises a separate object interpreter module 132 that is configured to interpret and translate object information into a form that can be inserted into an electronic device such as a mobile phone. The separate object interpreter module 132 is a module that is distinct from the illustrative Agfa Monotype text editor and test rasterizer. An object comprises pictures, sounds, contact information, and other such similar objects. An object comprises both data and procedures to manipulate the data. An illustrative object interpreter module 132 provides a means for rasterizing an object with an object rasterizer module that is configured to receive an instruction to read an object, performs a scaling function for the object, and adjusts the object for a grid of pixels. For the insertion of object, the object rasterizer 132 is associated with the text editor system 130. By way of example and not of limitation, if the object is a picture, then the picture may be displayed on an illustrative mobile phone display using the text editor system. In another illustrative example, if the object is a sound, the sound may be associated with a particular operation that is performed by the mobile phone.

When a user of the illustrative text editor system 130 elects to insert an object that is not recognized by the text editor 124 and the text rasterizer 126, a numerical value that falls within the UNICODE private area is associated with the user selected object. An illustrative intercept module 134 located on the text rasterizer module 126 is configured to distinguish between the numerical values that fall within the UNICODE private area and outside the UNICODE private area. If the particular numerical value falls within the illustrative UNICODE private area, the call is re-routed to the object interpreter module 132 (not originally supplied with the text editor). The particular numerical value that falls within the illustrative UNICODE private is "trapped" by the text editor 124. The object interpreter 132 executes returns the appropriate size for the particular object and proceeds to draw the object. The object interpreter module 132 is configured to operate in conjunction with the text rasterizer module 126 in the text editor system 130. This ability to insert objects adds significant functionality to the text editor module 124, while minimizing costs and not overwhelming the limited computational resources of small devices or embedded systems.

Figure 2:
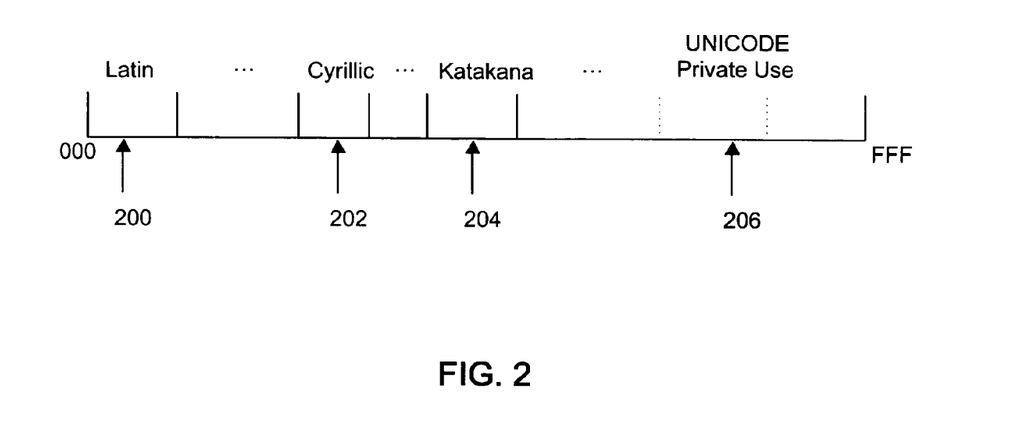
FIG. 2 shows an illustrative schematic representation of illustrative UNICODE numerical assignments according to one embodiment.

Referring to FIG. 2, there is shown the illustrative UNICODE mapping, including the ASCII Latin mapping as a subset. In order to use existing text editors to insert objects into text streams, the illustrative embodiment identifies private UNICODE areas to point to digital representations of objects. The numerical representation for the Latin 200 characters is at the lower end of the numerical scale, later (higher numerically) followed by the Cyrillic 202 alphabet, and later by Katakana 204 glyphs (other alphabets are in between those shown and/or follow the Katakana glyphs). Of particular interest is private area 206, where a developer may assign there own pointers to bitmaps, characters, or other digital representations of images to numerical representations without interfering with standard numerical character representations.

UNICODE is used as an illustrative example, but any numerical representation may be used. Accepted numerical representations tend to be easier to implement, as it requires the least changes be made to the existing text editor module 124. Those skilled in the art having the benefit of this disclosure shall appreciate that the numerical range(s) may be located anywhere. For example, the numerical ranges may be in any specified private use areas, or the numerical ranges may make use of ranges not used for specific implementations.

Continuing with private area 206, the systems and methods disclosed herein assigns objects (such as pictures) to this private area 206. The illustrative pictures and sounds provide digital representations usable to create a visual image that are different from text. By way of example, the objects are generated with object rasterization software related to numbers in this private area 206. An illustrative flowchart of an illustrative text editor rendering objects using private area 206 is illustrated in FIG. 3.

Figure 3:
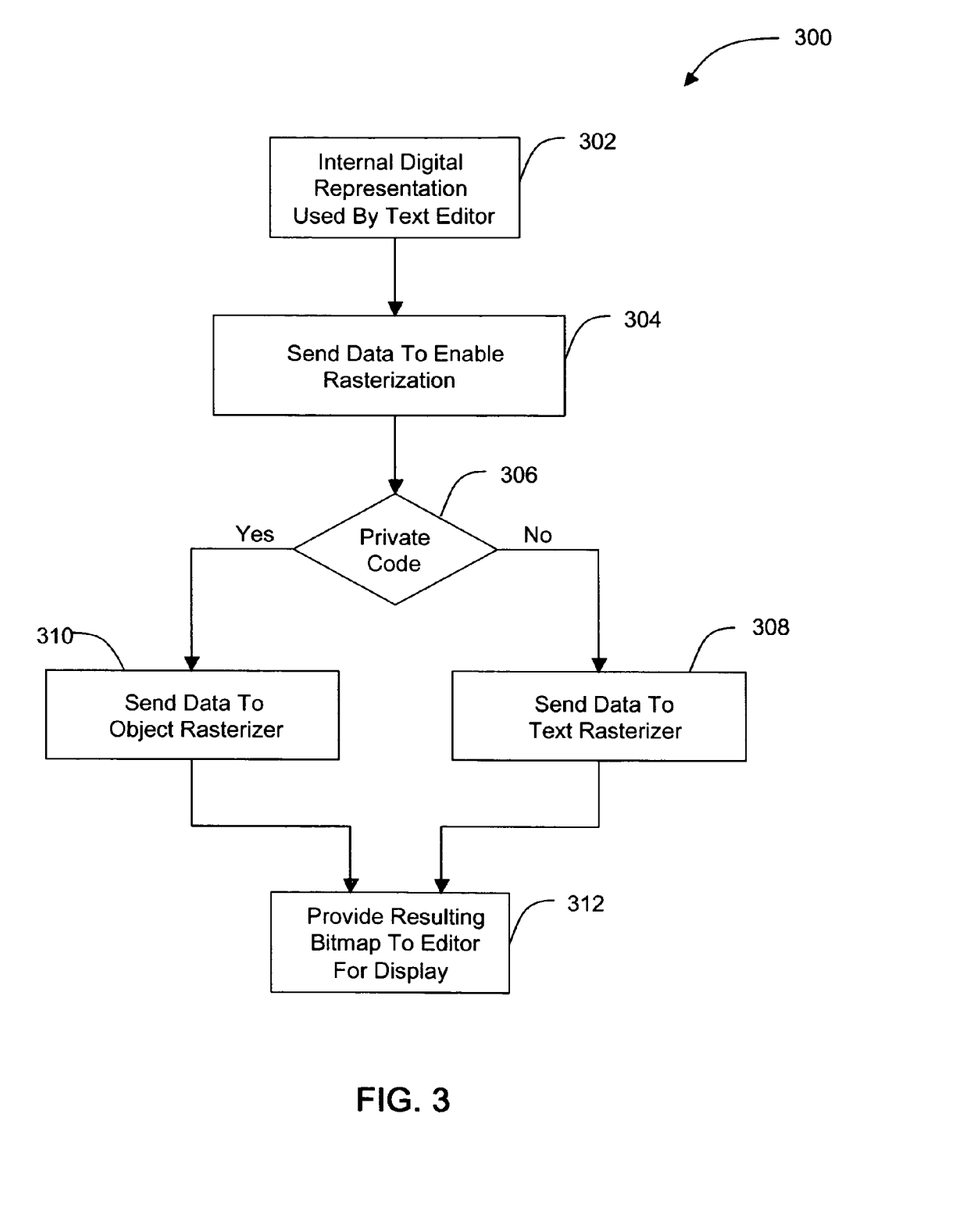
FIG. 3 shows an illustrative flowchart of a text editor rendering objects in accordance with an illustrative embodiment.

Referring to FIG. 3, there is shown an illustrative flowchart 300 of a text editor rendering pictures in accordance with an illustrative embodiment. The flowchart 300 is initiated at block 302, which corresponds to generating a plurality of numerical representations of text in a text editor. These numerical representations are held in various internal data structures, and are used by the text editor 124.

If the text editor and rasterizer are configured as two separate modules as illustrated in FIG. 1, then the text editor 124 makes a call. The call will include any needed data, such as the block size (usually expressed as a specified number of pixels for the height and width of the rectangle) and a number usable to look up the character. The intercept module 134 watches calls and checks the parameters of the call. If the existing rasterizer is built into the text editor, then a few lines of code will be added in the text editor that performs the same check as the intercept module.

Continuing to decision diamond 306, the illustrative intercept module 134 check the numerical values. If the number is not from the private area (or other designated numerical range if UNICODE is not used), the call is sent to the existing text rasterizer module; this corresponds to the "No" exit from decision point 306, and block 308 is entered. The actions corresponding to block 308 are those associated with the existing text rasterizing module, which uses the call parameters (or data otherwise available to the code) to generate a bitmap to be used to display the alphanumeric.

Returning to decision diamond 306, if the numerical value is from the UNICODE private area (or from a specially designated set of reference numbers when UNICODE is not used), then the "Yes" exit is taken to block 310. The actions taken are those needed to insert an object that is usable by the text editor in the illustrative display area 103. This includes using the base picture (simple line drawings to shaded and colored sketches/pictures) and the measurements of the display area to generate the desired bitmap.

After the bitmap is generated in either block 308 or 310, block 312 is entered. The bitmap of the alphanumeric character 308 or the picture 310 is made available to the text editor, which then causes it to be displayed on the device's display.

Figure 4:
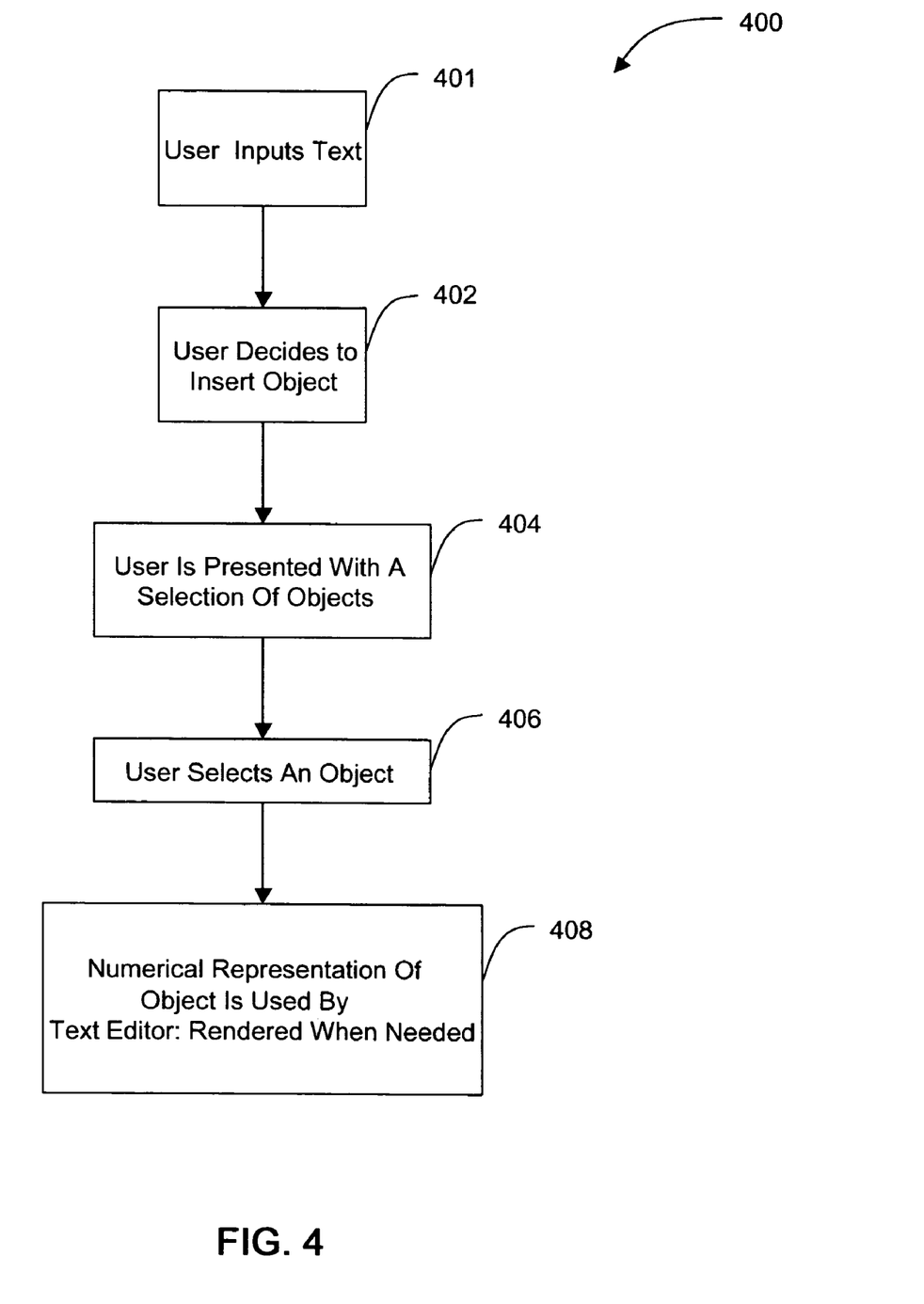
FIG. 4 shows an illustrative flowchart of an illustrative object selection process according to one embodiment.

Referring to FIG. 4, there is shown an illustrative flowchart 400 of an illustrative object selection process. The flowchart 400 is initiated at block 401, which corresponds to the actions taken by a user as they generate text, usually by using a keyboard. Continuing into block 402, a user decides they want to insert an object into the text stream. The user then selects a menu item, or presses a designated key sequence, which the device recognizes as a request for the insertion of the desired object.

Continuing into block 404, the device brings up a list of available objects, e.g. pictures and sounds. In one embodiment, the list may be a visual display of the pictures. Continuing into block 406, the user indicates which object, e.g. picture, they wish to insert into the text stream. The indication may be accomplished in any way the device designer may wish, including a numerical designator on the display which is typed in by the user, the use of a touch-screen, use of buttons or keypad locations associated with desired picture, or other such indication. Finishing the sequence in block 408, the internal numerical designator corresponding to the chosen object is kept by the text editor in its data structures. When the time comes for the text editor to display that object, a call is made to the object rasterizer module. The call will include a reference to the numerical designator of the picture. If UNICODE is used, it will be a number from the private area, as described above in the flowchart 300 of FIG. 3.

Figure 5:
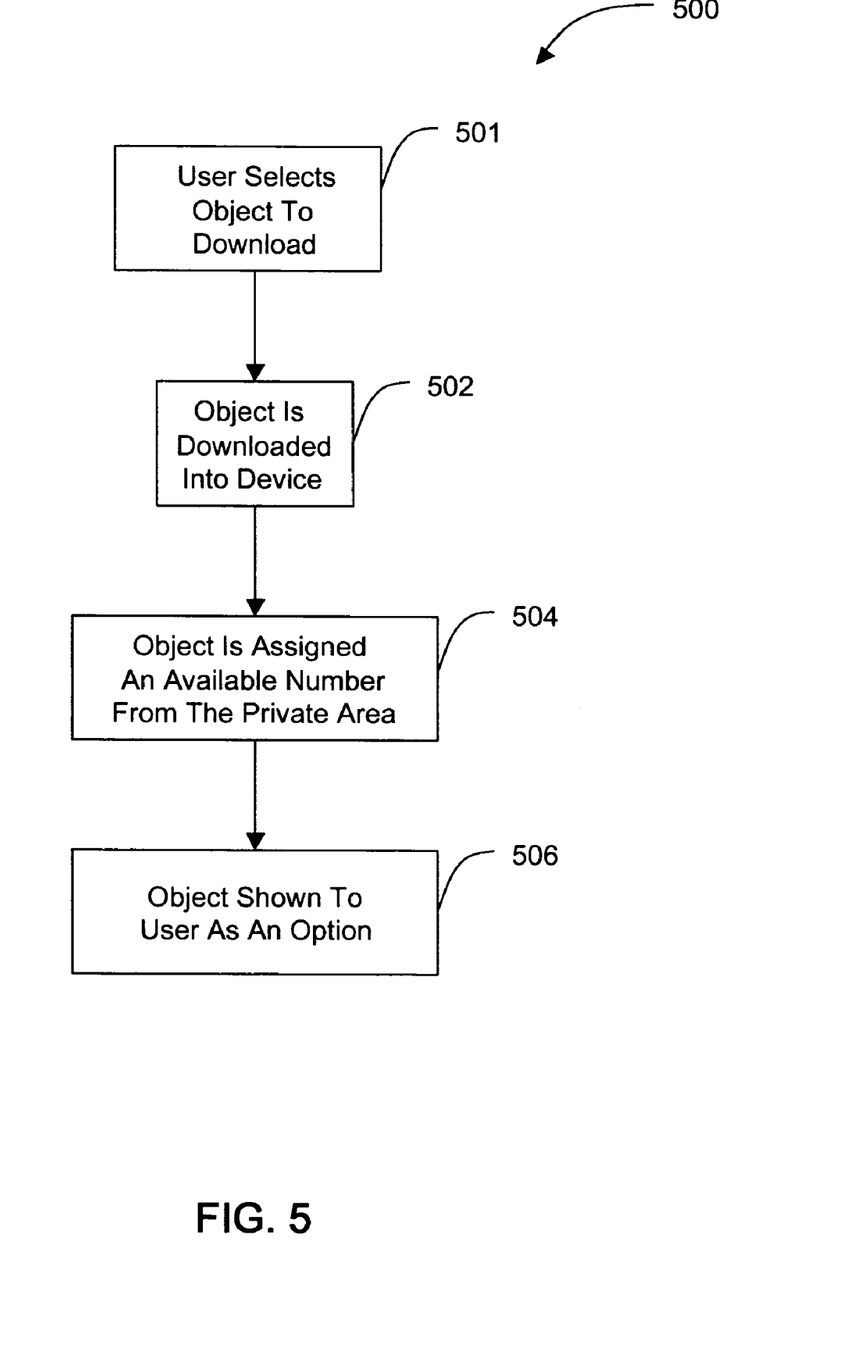
FIG. 5 shows an illustrative flowchart of the downloading of objects according to one embodiment.

Referring to FIG. 5, there is shown an illustrative flowchart 500 of the downloading of pictures for later use by the text editor. The flowchart 500 is initiated at block 501, which corresponds to an illustrative device being in operable communication with an external source for objects. This could include a local device such as a memory device on a USB port, or could be any suitable connection over a network such as an Ethernet network, a serial port connection, a wireless connection, or other such connection. The device communicates to the user that pictures are available for download, and may communicate that in any suitable way such as a selectable items on display, a text list, or other such communications. The user then selects one or more objects to download.

Continuing into block 502, the device requests the downloadable objects from the external source. By way of example and not of limitation, once the objects are downloaded, the text editor assigns the object an available reference number in the private area of the illustrative UNICODE map, which corresponds to the actions taken in block 504.

At block 506, the text editor makes the object available for use to a user. This may include showing or listing the object as an option in the object selection menus, as described above. When chosen, the object will be generated to match the specified mobile phone size, as described above.

It shall be appreciated by those of ordinary skill in the art having the benefit of this disclosure that the changes needed to implement the systems and methods described herein require little or no changes to the text editor.

In operation, if the text editor makes calls to a text rasterizer module, then no changes need to be made to the text editor. If the calls are sent to an intercept module between the text rasterizer module and the text editor, a few lines of software code may be added to the text rasterizer module. The intercept module or code added to the first rasterizer module simply checks the character code. If it falls in a specified range such as the UNICODE private range, the call is redirected to a second object rasterizer module.

The object rasterizer module has the ability to fit objects to the mobile or block size specified in the rasterization request. Some of the code will be specific to specific objects, while other portions of the code will make use of heuristics and best-fit algorithms for objects, e.g. pictures, that do not have code specifically for them. By way of example, the code will generate a bitmap, usable by the text editor to display the picture on the device's display.

This system and method enables the use of pictures in a device that previously could only handle text. It requires little or no change to the existing text editor, and minimizes the amount of additional memory needed to support the added functionality. This allows mobile phones and other such devices to generate pictures or symbols, without requiring substantial modification to a text editor.

It is to be understood that the foregoing is a detailed description of illustrative embodiments. The scope of the claims is not limited to these specific embodiments. Various elements, details, execution of any methods, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A method for inserting at least one object in a portable electronic device that includes a hardware system with a processor, a memory, an operating system, and a text editor, the method comprising:
   providing a text editor module configured to interface with the operating system, wherein the text editor is unable to insert an object, the text editor module configured to support UNICODE and scalable fonts, the text editor comprises a first set of UNICODE numerical values and a second set of UNICODE numerical values that are related to scalable fonts, wherein the second set of numerical values are UNICODE values from a UNICODE private area;
   associating the first set of numerical values with a text rasterizer module configured to generate text to display on a display area, wherein the text editor module is associated with the text rasterizer module;
   distinguishing between the first set of numerical values and the second set of numerical values with an intercept module;
   detecting at least one user selected object associated with the second set of numerical values usable by the text editor, wherein the user selected object is a non-text image;
   associating the second set of numerical values with a separate object rasterizer module configured to insert the user selected object into the display area.

2. The method of claim 1 further comprising integrating the text rasterizer module with the text editor module.

3. The method of claim 2 further comprising combining output from the text rasterizer module and the object rasterizer module to generate an image within the display area.

4. A portable electronic device configured to support inserting at least one object in a text editor, the portable electronic device comprising:
   a hardware system that includes a processor and a memory;
   an operating system associated with the hardware system;
   a text editor module configured to interface with the operating system, wherein the text editor module is unable to insert an object, the text editor module configured to support UNICODE and scalable fonts, the text editor comprises a first set of UNICODE numerical values and a second set of UNICODE numerical values, wherein the second set of UNICODE numerical values are from a UNICODE private area;
   a text rasterizer module configured to use at least one of the first set of numerical values to generate text to display on a display area, the text rasterizer module associated with the text editor module;
   at least one user selected object associated with the second set of numerical values usable by the text editor, wherein the user selected object is a non-text image;
   an intercept module configured to distinguish between the first set of numerical values and the second set of numerical values; and
   a separate object interpreter module configured to receive the second set of numerical values and insert the user selected object into the display area.

5. The portable electronic device of claim 1 wherein the text rasterizer module is integrated with the text editor module.

6. The portable electronic device of claim 5 wherein the text editor module combines output from the text rasterizer module and the object interpreter module to generate an image within the display area.

7. The portable electronic device of claim 6 wherein the display area comprises a height dimension and a width dimension.

8. A portable electronic device configured to support inserting at least one object in a text editor, the portable electronic device comprising:
   a hardware system that includes a processor and a memory;
   an operating system associated with the hardware system;
   a text editor module configured to interface with the operating system, wherein the text editor module is unable to insert an object, the text editor module configured to support UNICODE and scalable fonts, the text editor comprises a first set of UNICODE numerical values and a second set of UNICODE numerical values, wherein the second set of UNICODE numerical values are from a UNICODE private area;
   a means for rasterizing text using at least one of the first set of numerical values to generate text to display on a display area, the means for rasterizing text associated with the text editor module;
   at least one user selected object associated with the second set of numerical values usable by the text editor, wherein the user selected object is a non-text image;
   an intercept module configured to distinguish between the first set of numerical values and the second set of numerical values; and
   a separate means for rasterizing an object using the second set of numerical values to insert the user selected object into the display area.

9. The portable electronic device of claim 8 wherein the means for rasterizing text is integrated with said text editor module.

10. The portable electronic device of claim 9 wherein the text editor module combines output from the means for rasterizing text and the means for rasterizing objects to generate an image within the display area.

11. The portable electronic device of claim 10 wherein the display area comprises a height dimension and a width dimension.

* * * * *